United States Patent [19]

Yale

[11] 4,162,232

[45] Jul. 24, 1979

[54] RARE EARTH ACTIVATED RARE EARTH FLUOROGERMANATE

[75] Inventor: Ramon L. Yale, Ulster, Pa.

[73] Assignee: GTE Sylvania Incorporated, Stamford, Conn.

[21] Appl. No.: 932,096

[22] Filed: Aug. 9, 1978

Related U.S. Application Data

[63] Continuation-in-part of Ser. No. 891,072, Mar. 29, 1978, abandoned.

[51] Int. Cl.$^2$ .............................................. C09K 11/46
[52] U.S. Cl. ........................ 252/301.4 F; 252/301.4 H
[58] Field of Search .................. 252/301.4 F, 301.4 H

[56] References Cited

U.S. PATENT DOCUMENTS

| | | | |
|---|---|---|---|
| 2,748,303 | 5/1956 | Thorington | 252/301.4 F X |
| 3,650,974 | 3/1972 | Ward | 252/301.4 F |
| 3,715,611 | 2/1973 | De Mesquita et al. | 252/301.4 F X |
| 3,758,413 | 9/1973 | Peters | 252/301.4 F X |
| 3,923,529 | 12/1975 | Araujo et al. | 252/301.4 F X |
| 4,052,329 | 10/1977 | Fukada et al. | 252/301.4 F |

FOREIGN PATENT DOCUMENTS

| | | | |
|---|---|---|---|
| 45-19969 | 7/1970 | Japan | 252/301.4 F |
| 47-7361 | 3/1972 | Japan | 252/301.4 F |

*Primary Examiner*—Jack Cooper

[57] ABSTRACT

Rare earth activated rare earth fluorogermanates, represented by the formula: $[R_{1x}R_{2(1-x)}]_aF_bGeO_C$ wherein x is a value from about 0.9 to about 0.9998, a is a value of from about 2 to about 4, b is from about 0.85 to about 3.15, c is from about 4 to about 7.5 $R_1$ is selected from the group of Y, Gd and La and $R_2$ is selected from Eu, Gd, Tb and Pr and $R_1$ and $R_2$ are different, are excited by long or short wavelength ultraviolet light. A solid state process for using a blend of the metal oxides and a heat-decomposable fluorine compound is disclosed along with a preferred embodiment wherein the dual rare earth oxide is formed prior to forming the aforementioned blend of metal oxides.

10 Claims, 2 Drawing Figures

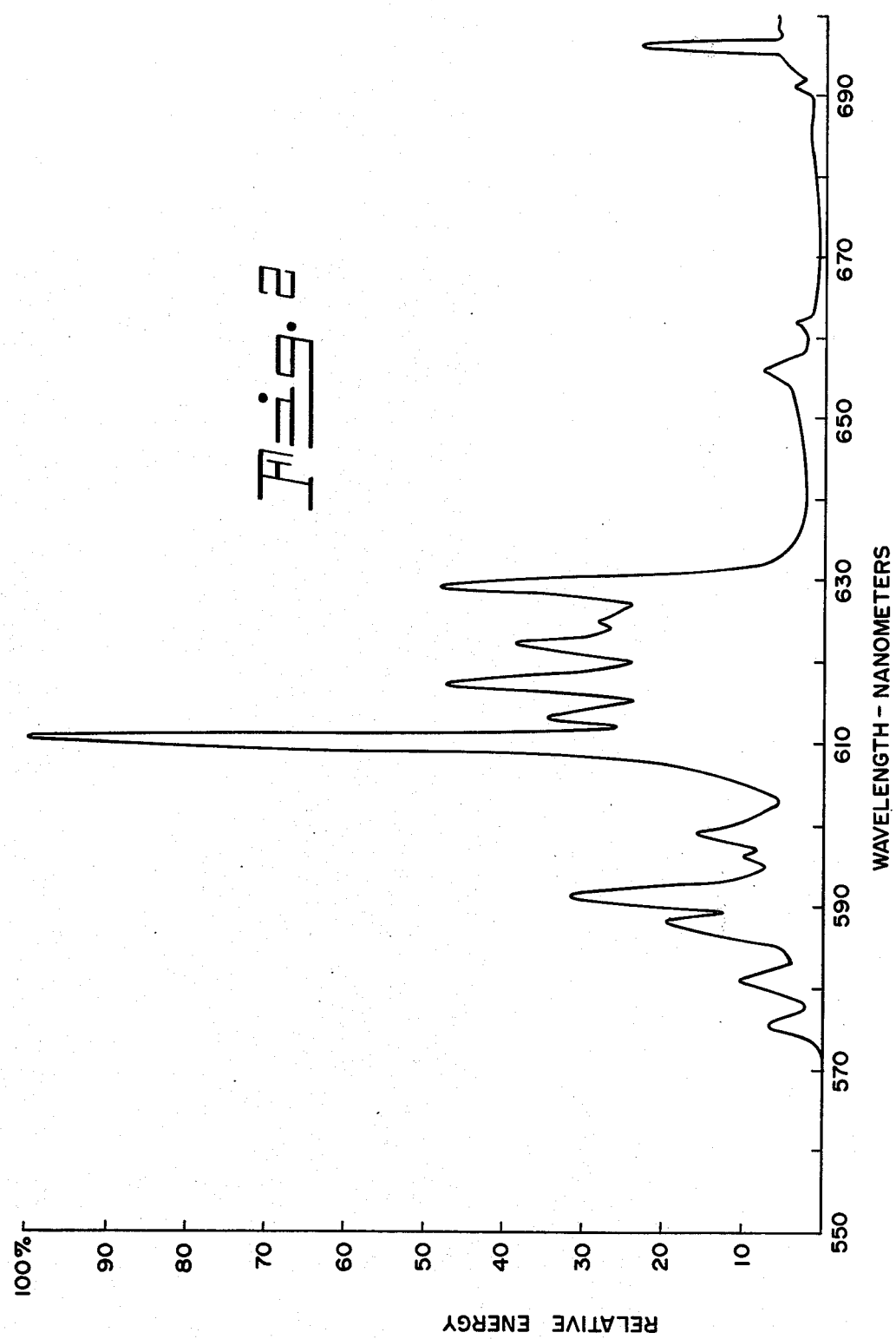

RARE EARTH ACTIVATED RARE EARTH FLUOROGERMANATE

CROSS REFERENCE TO RELATED APPLICATIONS

This application is a continuation in part of U.S. Patent Application No. 891,072 filed Mar. 29, 1978, now abandoned.

BACKGROUND OF THE INVENTION

1. Field of the Invention

This invention relates to fluorescent materials, more particularly it relates to fluorescent rare earth activated rare earth fluorogermantes.

2. Prior Art

Alkaline earth fluorogermanates are known. Magnesium flurogermanate is disclosed in U.S. Pat. No. 2,748,303 and is disclosed to be useful as a color corrector in high pressure mercury vapor lamps. As is shown in U.S. Pat. No. 2,748,303 the maximum peak emmission is about 658 nanometers and a secondary peak occurs at about 631 nanometers.

It is believed that providing a new luminescent material useful in fluorescent lamps that upon excitation by ultraviolet light yields a bright emission is an advancement in the art.

OBJECTS AND SUMMARY OF THE INVENTION

It is an object of this invention to provide a new luminescent material.

It is an additional object of this invention to provide a luminescent rare earth activated rare earth fluorogermanate.

It is an object of this invention to provide a solid state process for producing rare earth activated rare earth fluorogermanate from the blend of the metal oxides and a fluorine source.

It is a further object of this invention to provide a process wherein the dual rare earth metal oxides used as raw materials are co-precipitated from an aqueous solution prior to forming a blend with a fluorine source and germanium oxide.

These and additional objects of this invention are achieved in one aspect wherein a luminescent composition is provided that consists essentially of rare earth-activated rare earth fluorogermanate that can be described by the empirical formula: $[R_{1x} R_{2(1-x)}]_a F_b Ge O_c$ wherein $R_1$ is selected from Y, Gd and La, $R_2$ is selected from Eu, Gd, Tb and Pr and $R_1$ and $R_2$ are different rare earth elements, x is a value from about 0.9 to about 0.9998, a is from about 2 to about 4, b is from about 0.85 to about 3.15, c is from about 4 to about 7.5. The above luminescent composition can be excited by ultraviolet radiation.

In an additional aspect of this invention, a process preparing the above luminescent composition is provided that comprises forming a relatively uniform admixture of the two specific rare earth oxides, germanium oxide and a heat decomposable fluorine source, the admixture has the two rare earth in an atomic ratio of from about 9:1 to about 9998:2. If desired, a dual rare earth oxide composition, preferred for the dual rare earth oxide source, can be prepared by precipitating an oxalate of the two rare earths from an aqueous solution containing the rare earth ions, heating the oxalate in an oxidizing atmosphere to a terperature of about 800° C. to about 1100° C. for a time sufficient to convert the oxalate to the oxides. Thereafter the resulting oxides are blended with the fluorine source and the germanium oxide and the blend is fired at a temperature of from about 1200° C. to about 1600° C. hours in a non-reducing atmosphere for about 8 to about 16 hours.

BRIEF DESCRIPTION OF THE DRAWINGS

FIG. 2 is the emission spectra of $(Y_{0.956}Eu_{0.044})_3 F_3 GeO_5$ a typical phosphor of this invention.

Figure 1:
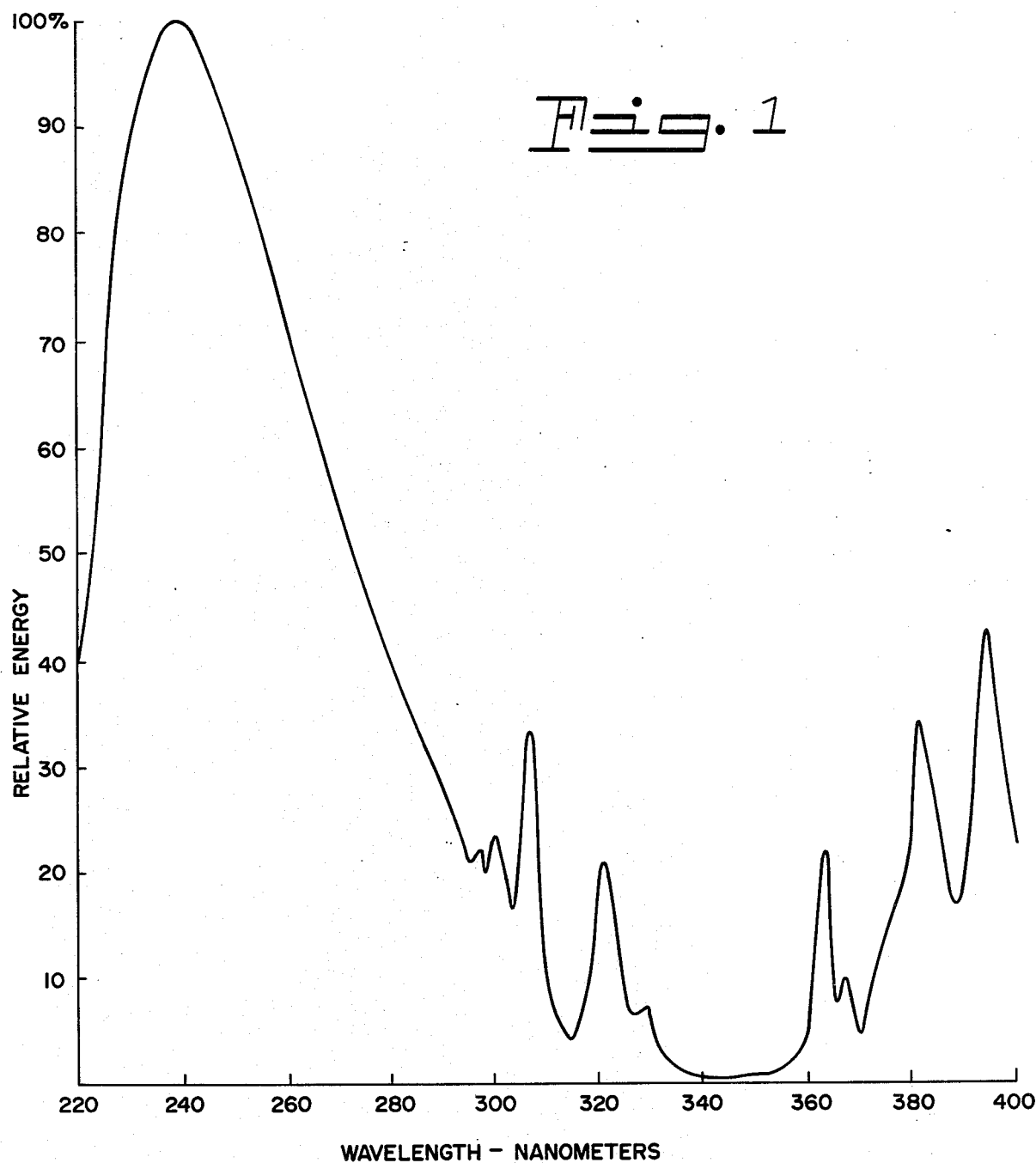
FIG. 1 is the excitation spectra of $(Y_{.956}Eu_{.044})_3 F_3 GeO_5$ a typical phosphor of this invention.

For a better understanding of the present invention, together with other and further objects, advantages and capabilities thereof, reference is made to the following disclosure and appended claims in connection with the above-described drawings.

DETAILS OF THE PREFERRED EMBODIMENTS

As previously mentioned a relative uniform admixture of the oxides of the two rare earths and germanium along with a decomposable fluorine source in proper atomic proportion is formed. By "decomposable fluorine source" it is meant a fluorine compound that upon being heated in a non-reducing atmosphere to about 1100° C. for about 8 hours will decompose to form fluorine or a fluoride ion and volatile material. Ammonium fluoride is a perferred fluoride source and although organic fluorides can be used they are more expensive and hence not preferred.

It is preferred that prior to forming the blend of metal oxides and the decomposable fluorine source, to prepare a uniform mixture of the rare earth oxides. Since a relatively small amount of the rare earth activator species selected from the group consisting of Eu, Gd, Tb and Pr is added in proportion to the other elements, a uniform distribution of the actuator element can be achieved by co-precipitating activator and host rare earths selected from the group consisting of Eu, Gd, Tb and Pr from aqueous solution containing them and thereafter converting the resulting precipitate to the mixed oxide by heating in an oxidizing atmosphere. For example, the chloride or nitrates of the rare earths are water soluble and after the aqueous solution is formed, oxalic acid can be added to form the mixed cation oxalate. The oxalate can be heated to a temperature of from 800° C. to about 1100° C. in an oxidizing atmosphere for at least about 2 hours to convert the oxalate to the mixed oxide. The resulting material can then be blended with the appropriate amount of the decomposable fluorine compound and germanium oxide to form a uniform admixture having an atomic ratio of $(R_1+R_2)$:F:Ge of about 2:.85:1 to about 4:3.15:1 It is preferred, however to maintain as close as possible to the aforementioned ratios. The atomic ratio of the activator rare earth to the host rare earth should be from about 1:9 to about 2:9998.

In order to more fully describe the invention the following detailed example is presented. All parts, proportions and percentages are by weight unless otherwise indicated.

EXAMPLE 1

About 171 parts of a mixed oxide containing a Y:Eu atomic ratio of about 1:.022 is prepared by oxidizing the corresponding oxalate by heating the oxalate in an air atmosphere to about 800° C. for about 1 hour. The above Y:Eu mixed oxide is blended with about 56 parts of ammonium fluoride and about 53 parts of germanium oxide for a time sufficient to form a relatively uniform admixture. The admixture is placed in an aluminum oxide crucible and fired in a nonreducing atmosphere such as air at a temperature of about 1400° C. for about 12 hours. The excitation spectra of the resulting phosphor is shown in FIG. 1 and the emission spectra of the material is shown in FIG. 2. As is apparent the phosphor is efficiently excited by radiation in the range of from about 250 to about 300 nanometer range. The excitation spectra also has strong peaks between about 350 and 470 nanometers. The emission spectra is a relatively narrow band with the maximum at about 610 nanometers and a secondary peak of about 628 nanometers. The material is useful in mercury vapor lamps since it can be excited by 254 nanometer excitation. The preferred ratios of yttrium to europium are from about 94:6 to about 96:4.

EXAMPLE 2

About 65 parts of yttrium oxide, about 4.35 parts of gadolinium oxide, about 22.2 parts of ammonium fluoride and about 20.9/parts of germanium oxide are blended together to form a relatively uniform admixture which is heated for about 3 hours at about 650° C. The heated admixture is thereafter blended with from about 1 to 2% by weight of sodium fluoride as a flux. The mixture including the flux is heated about 1220° C. for about 3 hours. The fired material represented by the formula, $(Y_{0.96}Gd_{0.04})_3 F_3 GeO_5$ yields a yellow emission when excited by ultraviolet light.

EXAMPLE 3

Following essentially the same procedure as given for Example 2 the following raw materials are used.

| Parts | Materials |
|---|---|
| 108.2 | $Gd_2O_3$ |
| 0.56 | $Tb_4O_7$ |
| 22.2 | $NH_4F$ |
| 20.9 | $GeO_2$ |

The fired material, corresponding to the formula, $(Gd_{0.995}Tb_{0.005})_3F_3GeO_5$, emits a green/blue emission under ultraviolet excitation.

EXAMPLE 4

About 25.9 parts $Y_2O_3$, about 1.86 parts $Eu_2O_3$, about 6.28 parts germanium oxide and about 4.44 parts of ammonium fluoride are blended together to form a relatively uniform admixture. The admixture is thereafter fired at about 1300° C. for about 63 hours. The mixture, after firing, corresponds to the material having the formula: $[Y_{.956} Eu_{.044}]_4 F_2 Ge O_7$ and luminesces under 253.7 nanometer excitation as shown in FIG. 2.

EXAMPLE 5

Following the procedure given in Example 1 about 47.43 parts of a mixed oxide containing a Y:Pr atomic ratio of about 9997:3 is prepared. The above mixed oxide is blended with about 22 parts of $GeO_2$ and about 6.67 parts of ammonium fluoride to form a relatively uniform admixture. The above admixture is heated at avout 800° C. for about 2 hours, cooled reblended and heated for about 20 hours at 1300° C. The resulting material corresponding to the formula, $(Y_{0.9997} Pr_{0.0003})_2 F GeO_{4.5}$ luminesces under 253.7 nanometer excitation.

EXAMPLE 6

Following the procedure given in Example 1 about 68.42 parts of a mixed oxide containing a La:Pr atomic ratio of about 9997:3 is prepared. The above mixed oxide is blended with about 22 parts of $GeO_2$ and about 6.67 parts of ammonium fluoride to form a relatively uniform admixture. The above admixture is heated at about 800° C. for about 2 hours, cooled reblended and heated for about 20 hours at 1300° C. The resulting material corresponding to the formula, $(La_{.9997} Pr_{.0003})_2 F GeO_{4.5}$ luminesces under 253.7 nanometer excitation.

EXAMPLE 7

Following the procedure given in Example 1 about 76.12 parts of a mixed oxide containing a Gd:Pr atomic ratio of about 9997:3 is prepared. The above mixed oxide is blended with about 22 parts of $GeO_2$ and about 6.67 parts of ammonium fluoride to form a relatively uniform admixture. The above admixture is heated at about 800° C. for about 2 hours, cooled reblended and heated for about 20 hours at 1300° C. The resulting material corresponding to the formula, $(Gd_{0.9997} Pr_{.0003})_2F GeO_{4.5}$ luninesces under 253.7 nanometer excitation.

It is preferred to fire the final admixture at a temperature between about 1220° C. to about 1350° C. although the temperatures of from about 1200° C. to about 1600° C. can be used. Furthermore, an alkali metal halide flux can be used to aid in particle size control.

While there has been shown and described what are at present considered the preferred embodiments of the invention, it will be obvious to those skilled in the art that various changes and modifications may be made therein without departing from the scope of the invention as defined by the appended claims.

What is claimed is:

1. A luminescent composition consisting essentially of a rare earth activated rare earth fluorogermanate represented by the formula: $[R_{1x} R_{2(1-x)}]_a F_b Ge O_c$ wherein $R_1$ is selected from Y, La and Gd, $R_2$ is selected from Eu, Gd, Tb and Pr and $R_1$ and $R_2$ are different rare earth elements, x is from about 0.9 to about 0.9998, a is from about 2 to 4, b is from about 0.85 to about 3.15 and c is from about 4 to about 7.5.

2. A composition according to claim 1 wherein a is about 2, b is about 3 and c is about 5.

3. A composition according to claim 2 wherein $R_2$ is europium.

4. A composition according to claim 3 wherein $R_1$ is Y.

5. A compostion according to claim 4 wherein x is from about 0.94 to about 0.96.

6. A process for producing a luminescent composition according to claim 1.

(a) forming a relatively uniform admixture of a first rare earth oxide selected from the group consisting of yttrium oxide, gadolinium oxide and lanthanium oxide, a second rare earth oxide selected from the oxides of europium, gadolinum, terbium and praseodymium, wherein said first and second rare earth oxides are different, germanium oxide and a heat decomposable fluorine source, said mixture having a first to second rare earth oxide molar ratio of from about 9:1 to about 9998:2, and a total rare earth: F:Ge atomic ratio of from about 2:0.85:1 to about 4:3.15:1 respectively, and (b) firing said admixture at a temperature of from about 1200° C. to about 1600° C. hours in a non-reducing atmosphere for at least about 8 hours.

7. A process according to claim 6 wherein a source of the first and second oxides are prepared by precipitating a mixed rare earth oxalate of a first rare earth and a second rare earth from an aqueous solution containing ions of said rare earths, heating said oxalate in an oxidizing atmosphere to a temperature of about 800° C. to about 1100° C. for a time sufficient to convert the oxalate to the mixed rare earth oxide.

8. A process according to claim 6 wherein said admixture is fired at a temperature of from about 1220° C. to about 1350° C.

9. A process according to claim 6 wherein the rare earth to the fluorine to germanium atomic ratio is about 3:3:1, respectively.

10. A process according to claim 6 wherein the ratio or rare earth to fluorine to germanium atomic ratio is about 2:0.85:1 respectively.

* * * * *